No. 852,383. PATENTED APR. 30, 1907.
G. W. GRISWOLD.
CRANBERRY SCOOP OR PICKER.
APPLICATION FILED JAN. 21, 1907.
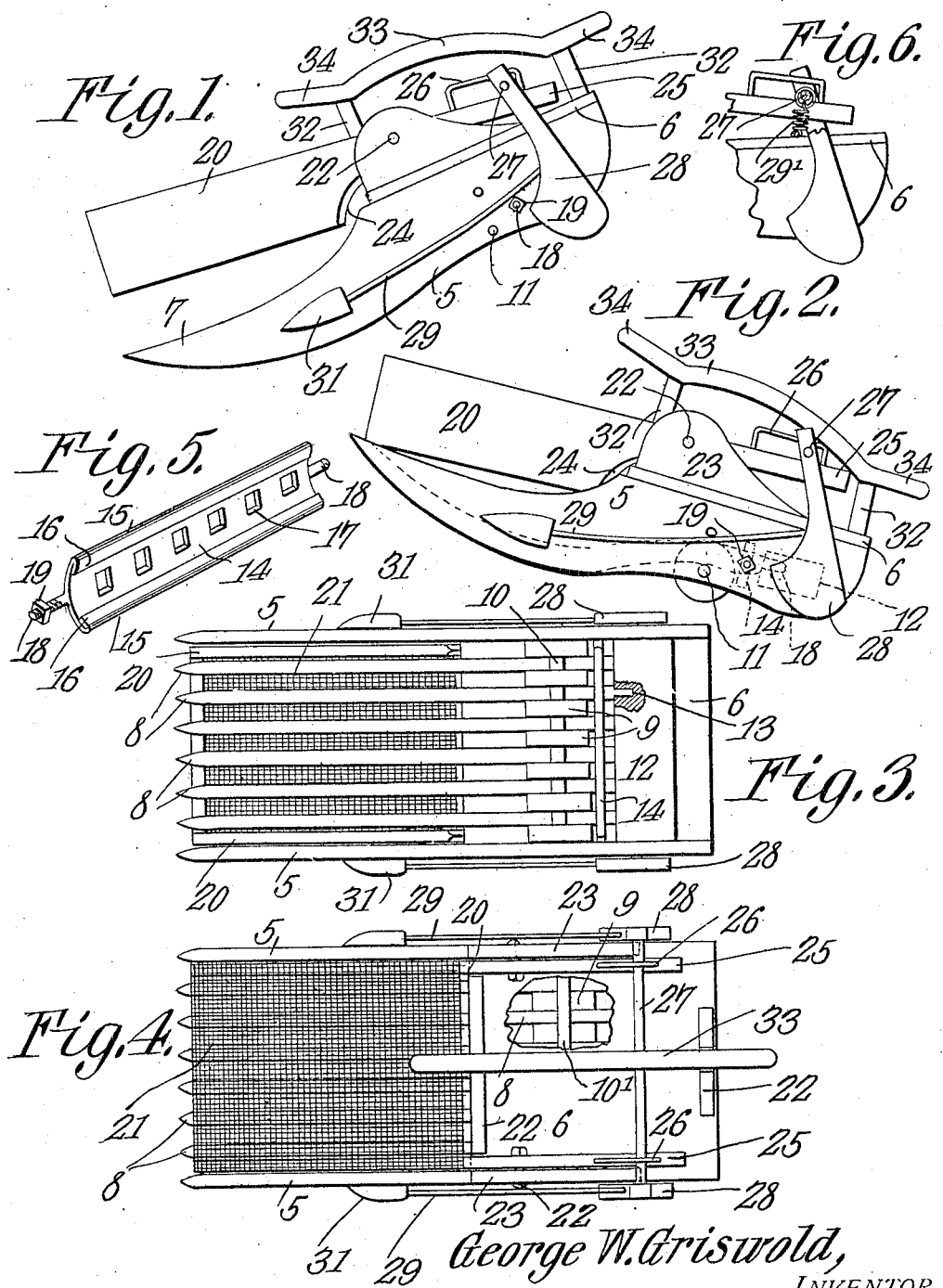
George W. Griswold,
INVENTOR.
WITNESSES:
By C. A. Snow & Co
ATTORNEYS

UNITED STATES PATENT OFFICE.

GEORGE W. GRISWOLD, OF MANOMET, MASSACHUSETTS, ASSIGNOR OF ONE-HALF TO MELVIN L. CHILDS, OF WALTHAM, MASSACHUSETTS.

CRANBERRY SCOOP OR PICKER.

No. 852,383.  Specification of Letters Patent.  Patented April 30, 1907.

Application filed January 21, 1907. Serial No. 353,295.

*To all whom it may concern:*

Be it known that I, GEORGE W. GRISWOLD, a citizen of the United States, residing at Manomet, in the county of Plymouth and State of Massachusetts, have invented a new and useful Cranberry Scoop or Picker, of which the following is a specification.

This invention relates to cranberry scoops or pickers and has for its object to effect certain improvements in devices of this character whereby cranberries may be more readily picked from the vines than heretofore and with the least possible degree of injury to both the berries and vines.

A further object of the invention is to provide a scoop having a pivoted cover or closure for preventing accidental displacement of the berries when the scoop is drawn upwardly through the vines, and means for automatically releasing the cover to permit the discharge of the berries.

A further object is to provide means for detachably securing the teeth or tines in position on the scoop whereby any particular tooth may be quickly removed and replaced by a new one when the same becomes broken or otherwise injured.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a side elevation of a cranberry scoop or picker constructed in accordance with my invention showing the same in position to remove the berries from the vine. Fig. 2 is a similar view showing the rear end of the scoop tilted and the pivoted cover or closure in closed position. Fig. 3 is a bottom plan view of the same. Fig. 4 is a top plan view. Fig. 5 is a detail perspective view of the tine supporting bar. Fig. 6 is a side elevation of a portion of a scoop illustrating a modified form of the invention. Similar numerals of reference indicate corresponding parts in all of the figures of the drawings.

The improved device consists of the side members 5 spaced apart by a connecting strip 6 and having their forward ends reduced to form curved terminals 7.

Interposed between the side members 5 are spaced teeth or tines 8, the inner ends of which are spaced apart by a series of disks or spacing blocks 9, the latter being fastened in position by means of a rod or bar 10 which pierces the side members 5, as indicated at 11.

Extending transversely across the spacing blocks is a retaining bar or rod 10' which bears against the upper surfaces of the several teeth or tines and serves to lock the same in engagement with the rod 10.

Interposed between the side members 5 at the rear end of the scoop is a reinforcing block 12 having a plurality of spaced openings 13 formed therein for the reception of the adjacent terminals of the tines 8.

As a means for locking the tines in position on the scoop there is provided a transverse retaining bar 14 preferably formed of a single piece of metal the opposite longitudinal edges of which are curved laterally, as indicated at 15 and provided with reinforcing or strengthening flanges 16.

The retaining bar 14 is provided with a plurality of spaced openings 17 disposed in alinement with the openings 13 in the block 12 and adapted to receive the adjacent ends of the teeth or tines 8, said bar having its opposite ends reduced to form threaded terminals 18 which pass through the side members 5 for engagement with suitable clamping nuts 19. It will thus be seen that by tightening the clamping nuts 19 the walls of the perforations 17 will engage the adjacent ends of the tines 8 and thus lock the latter in engagement with the spacing blocks 9 so as to effectually prevent accidental displacement of said teeth or tines. It will also be seen that by releasing or loosening the nuts 19 the pressure exerted by the bar 14 on the teeth or tines will be released thus permitting any particular tine to be readily removed when the same becomes broken or otherwise injured, and replaced by a new one.

As a means for preventing accidental displacement of the berries when the scoop is drawn upwardly through the vines there is provided a pivoted cover or closure 20 the upper surface of which is preferably covered with wire-netting 21, said top or cover being pivotally mounted at 22 between a pair of spaced ears 23 extending vertically from the connecting piece 6.

The side bars of the cover or closure are cut away at 24 to form longitudinally disposed arms 25 and secured to said arms at points adjacent their free ends are alined keepers or loops 26 for the reception of a transverse rod 27. Secured to the opposite ends of the rod 27 are traction shoes 28 which normally extend below the lower edges of the side members 5 so that when the shoes 28 are forced into engagement with the ground the transverse rod 27 through the medium of the keepers 26 will tilt said cover or closure 20 and move the same to closed position thus preventing accidental displacement of the berries.

The shoes 28 are normally and yieldably supported in lowered position by means of springs 29 one end of each of which is secured to the adjacent shoe while the opposite end thereof is fastened in any suitable manner to a lug or projection 31 carried by the side members 5.

Secured to and extending vertically from the connecting piece 6 are spaced posts or standards 32 to which is secured a bar or handle 33 having its intermediate portion bowed outwardly and its opposite ends extended beyond the posts 32 to form terminal finger pieces or hand grips 34.

In operation the scoop is drawn through the vines with the rear end thereof tilted upwardly and with the points of the tines bearing against the ground, as best shown in Fig. 1 of the drawings thus detaching the berries from the vine and causing the same to be deposited on the tines. When it is desired to empty the scoop the rear end of the latter is tilted downwardly to the position shown in Fig. 2 of the drawing thus forcing the traction shoes 28 upwardly and through the medium of the transverse rod 27 causing the cover 20 to be moved to closed position so that the scoop may be passed upwardly through the vines and the berries deposited into a suitable receptacle without danger of displacing said berries during the passage of the scoop through the vines. As soon as the scoop is elevated above the ground the spring 29 will automatically move the shoes 28 to lowered or normal position and consequently elevate the closure or cover 20 thus permitting the scoop to be again used for gathering berries. The perforated closure or cover 12 not only serves to prevent accidental displacement of the cranberries when the scoop is passed upwardly through the vines but also serves to remove any deposits of dirt or other foreign matter taken up by the tines, the latter result being accomplished by reversing the scoop when the same is filled with cranberries and shaking or vibrating said scoop to remove said material.

In Fig. 6 of the drawings there is illustrated a modified form of the invention in which the flat springs 29 are dispensed with and suitable coiled springs 29' secured to the transverse rod 27 and top of the scoop, respectively, for elevating the front end of the pivoted cover or closure.

From the foregoing description it is thought that the construction and operation of the device will be readily understood by those skilled in the art and further description thereof is deemed unnecessary.

Having thus described the invention what is claimed is:

1. A cranberry picker including a scoop, a cover, and means operatively connected with the cover and adapted to engage the ground for moving the cover to closed position.

2. A cranberry picker including a scoop having a pivoted cover, and means operatively connected with the cover for moving the latter to closed position when the scoop is tilted rearwardly in engagement with the ground.

3. A cranberry picker including a scoop, a cover for the scoop, means for moving the cover to closed position when the rear end of the scoop is tilted downwardly, and means for releasing the cover when the scoop is tilted in the opposite direction.

4. A cranberry picker including a scoop, a cover pivotally mounted on the scoop, and shoes operatively connected with the scoop for moving the cover to closed position.

5. A cranberry picker including a scoop, a cover pivotally mounted on the scoop, shoes operatively connected with one end of the cover and normally projecting below the scoop, and means for yieldably holding the shoes in normal position.

6. A cranberry picker including a scoop, a cover pivotally mounted on the scoop, a rod extending transversely of one end of the cover and provided with depending shoes for moving the cover to closed position, and springs connected with the scoop and shoes, respectively.

7. A cranberry picker including a scoop, a perforated cover pivotally mounted on the scoop and provided with an arm, a transverse rod engaging the arm, depending shoes carried by the rod, and springs connecting the scoop and shoes for normally holding the cover in open position.

8. A cranberry picker including a scoop having spaced tines, a perforated cover extending over the tines, shoes operatively connected with one end of the cover for moving said cover to closed position, and springs engaging the shoes for moving the cover to open position.

9. A cranberry picker including a scoop, a cover pivotally mounted on the scoop and provided with spaced arms, keepers carried by the arms, a shaft extending through the keepers and provided with depending shoes for moving the cover to closed position, and springs operatively connected with the shoes and scoop respectively.

10. A cranberry picker including a scoop provided with spaced tines, a cover pivotally mounted on the scoop and having one end thereof extended beyond its pivot point to form spaced arms, keepers carried by the arms, a shaft extending through the keepers, shoes depending from the opposite ends of the shaft for moving the cover to closed position, springs operatively connected with the shoes for returning the cover to open position, and an operating handle secured to the scoop.

11. A cranberry picker including a scoop provided with side members, a reinforcing block interposed between the side members and provided with spaced sockets, spacing blocks, tines interposed between the spacing blocks and having their adjacent ends seated in the sockets, and a locking bar engaging the tines for holding the same in engagement with the spacing blocks.

12. A cranberry picker including a scoop having side members, a reinforcing block connecting the side members, said block having sockets formed therein, spacing blocks, tines interposed between the adjacent spacing blocks and having their adjacent ends seated in the sockets in the reinforcing blocks, a transverse bar having perforations formed therein for the reception of the tines and having its opposite ends extending through the side members of the scoop and provided with terminal threads, and clamping nuts engaging the threads on the bar for locking the tines in engagement with the spacing blocks.

13. A cranberry picker including a scoop provided with spaced tines, a cover pivotally mounted on the scoop, shoes operatively connected with the cover for moving the same to closed position, springs for returning the cover to open position, and means for locking the tines in position on the scoop.

14. A cranberry picker including a scoop provided with side members, spaced detachable tines interposed between the side members, a locking bar having perforations formed therein for the reception of the tines, a cover pivotally mounted on the scoop above the tines, shoes operatively connected with the cover for moving the latter to closed position, springs secured to the side members of the scoop and operatively connected with the shoes for moving the cover to open position, and means for adjusting the locking bar thereby to prevent accidental displacement of the tines.

15. A cranberry picker including a scoop, a cover, and means operatively connected with the cover and projecting beyond the bottom of the scoop for moving the cover to closed position.

In testimony that I claim the foregoing as my own, I have hereto affixed my signature in the presence of two witnesses.

GEO. W. GRISWOLD.

Witnesses:
   V. T. FOSTER,
   I. S. BREWSTER.